United States Patent [19]

Heaton

[11] 3,859,738

[45] Jan. 14, 1975

[54] VEHICLE PARKING INSTRUCTION CURB DEVICE

[76] Inventor: Joe Heaton, 120 W. Washington St., Tipton, Ind. 46072

[22] Filed: Oct. 30, 1973

[21] Appl. No.: 411,112

[52] U.S. Cl. .................................. 35/11, 116/28 R
[51] Int. Cl. ............................................. G09b 9/04
[58] Field of Search...... 35/11; 40/129 R; 116/63 R, 116/63 P, 28 R, 28 A

[56] References Cited
UNITED STATES PATENTS
2,798,451   7/1957   Hund ................................ 116/63 P Primary Examiner—Wm. H. Grieb

[57] ABSTRACT

Automobile parking instruction devices, particularly a portable and resiliently suspended curb element employed in combination with a plurality of pressure sensitive elements supported on the parking surface in front of the curb, so as to signal position of the parked student vehicle tires with respect to the curb and, count the number of times the curb is touched during the student's parking.

15 Claims, 5 Drawing Figures

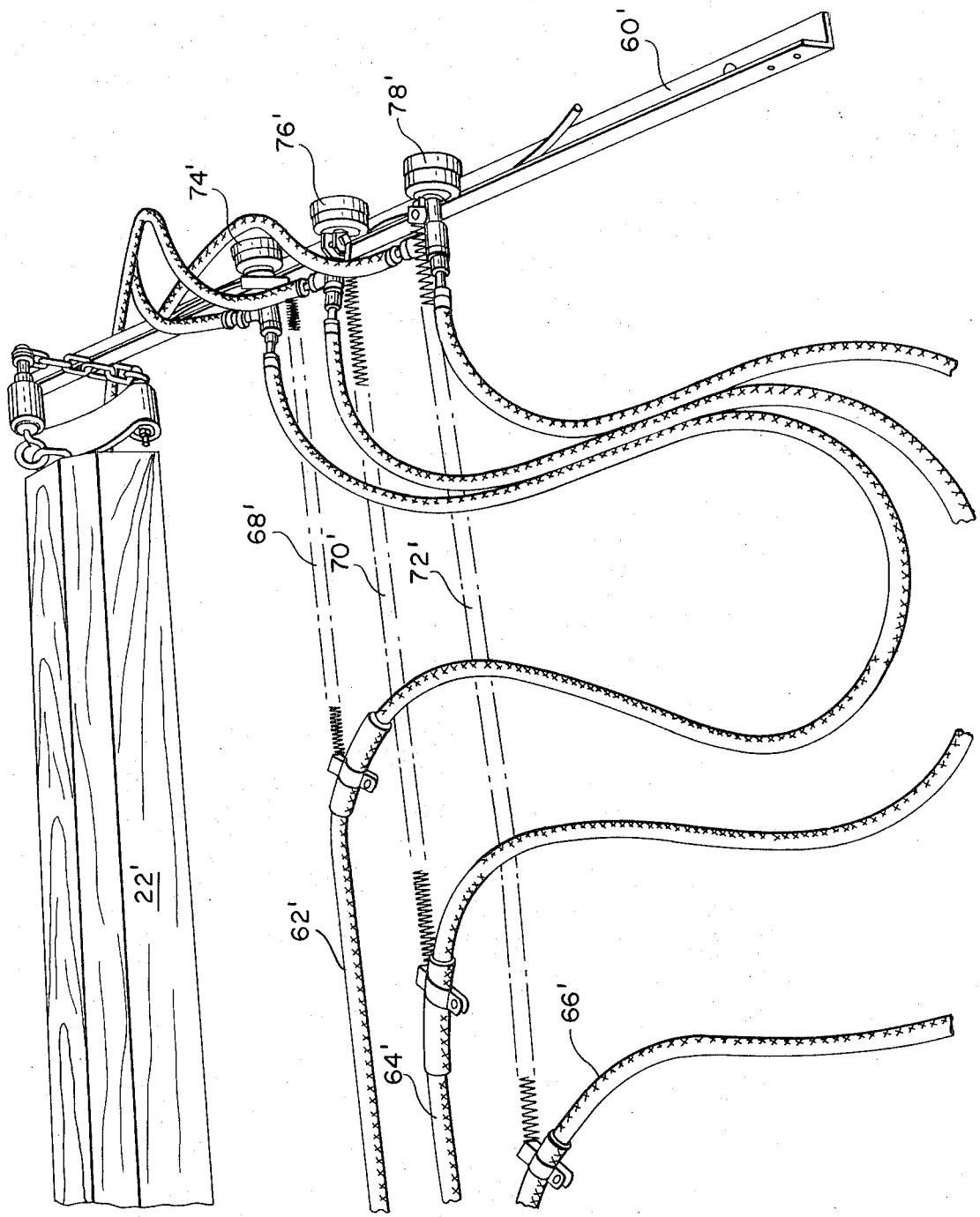

VEHICLE PARKING INSTRUCTION CURB DEVICE

BACKGROUND OF THE INVENTION

1. Field of the Invention

Vehicle including automobile and truck driver training and evaluation, particularly instruction in parallel parking with respect to a raised curb or loading dock. The device may be used in training diagonal or straight-in "garage type" parking, where the curb is used to measure wheel position.

A great deal of recent attention has been given to driver training instruction at the high school or pre-licensing level. The training routinely consists of both classroom and highway instruction, the latter sometimes including parking training. Parking training, for the most part, has been devoted to attempted parking between empty crude oil barrels and with respect to an artificial curb rigidly mounted in the high school parking lot. These techniques suffer both from fender damage inflicted when the student driver touches the barrel and from the artificiality of parking against a curb without other vehicles present.

Conventionally, scoring of the trainee in such devices has been by means of tape measurement of the distance from the painted or solid curb to the vehicle tires with respect to the number of minutes required.

SUMMARY OF THE INVENTION

According to the present invention, a pair of portable base elements are provided for resilient suspension of corresponding curb elements above the parking surface. The curb elements may be, for example, 10 to 20 feet in length and aligned with respect to each other, so as to define a conventional 24 foot parking surface. Pneumatic signalling means are supported upon the base surfaces and laid out upon the parking surface in front of the curb elements. Also, pressure sensitive signal means may be interposed between the base and the individual curb elements. As a result, the student driver in attempted parking depresses the pneumatic signalling means as well, perhaps, as the curb element. The depression activates the signalling and scoring means resulting in a scoring of the parking effort and visual or audible signalling of error.

The devices are portable and they may be moved about in a high school parking lot or shopping center. Also, the devices may be moved from town to town in support of a statewide driver training program. The devices may be used in connection with one or more simulated vehicles which may be placed at either end, so as to enhance the reality of the parking situation without injury to the trainee vehicle.

BRIEF DESCRIPTION OF THE DRAWINGS

FIG. 5 is an enlarged fragmentary view of the other end of the curb element, showing support of the signalling means and pneumatic elements parallely and in front of the curb.

DESCRIPTION OF THE PREFERRED EMBODIMENTS

Figure 1:
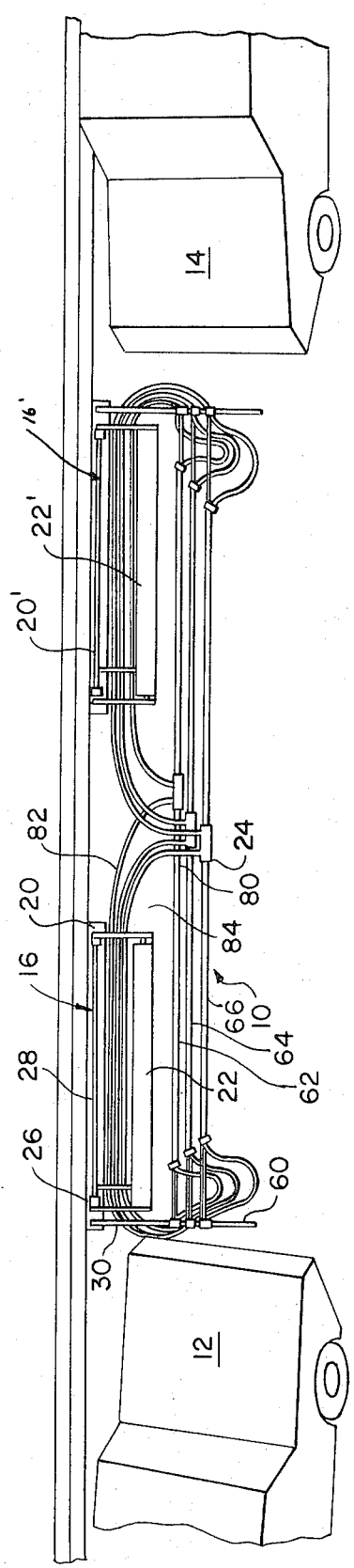
FIG. 1 is a top plan of the parking training device, showing a pair of curb elements and pneumatic signalling means aligned intermediate two simulated vehicles.

In FIG. 1 the parking training system 10 is shown as laid out between simulated vehicle rear 12 and simulated vehicle front 14. The parking system includes a pair of identical base elements 16 and 16' and corresponding curbshaped elements 22 and 22' suspended resiliently from the base elements.

Figure 2:
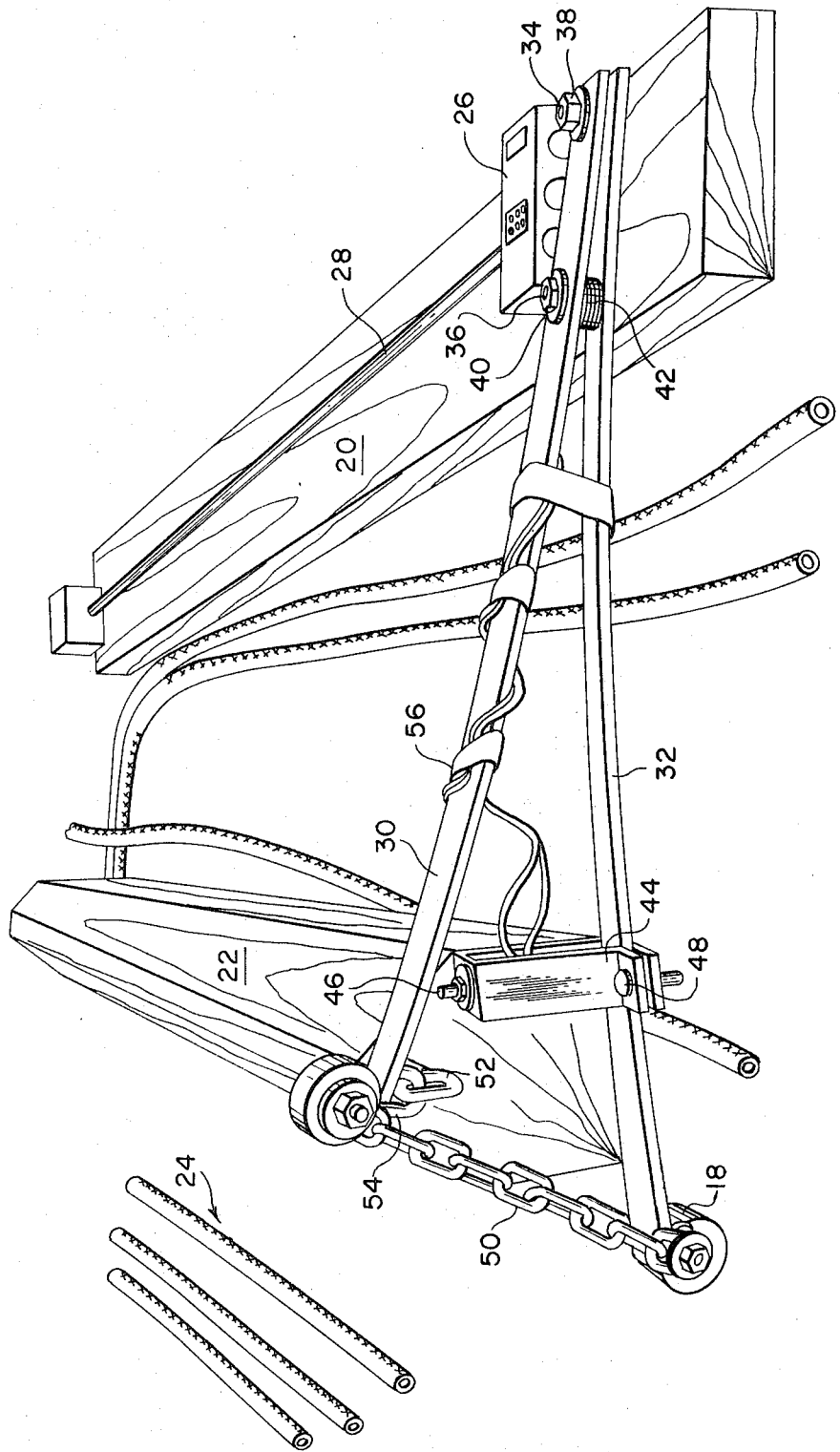
FIG. 2 is an enlarged perspective showing the leaf spring resilient suspension of an individual curb element with respect to a flat base element and interposed pressure sensitive "push-button" switch.
Figure 3:
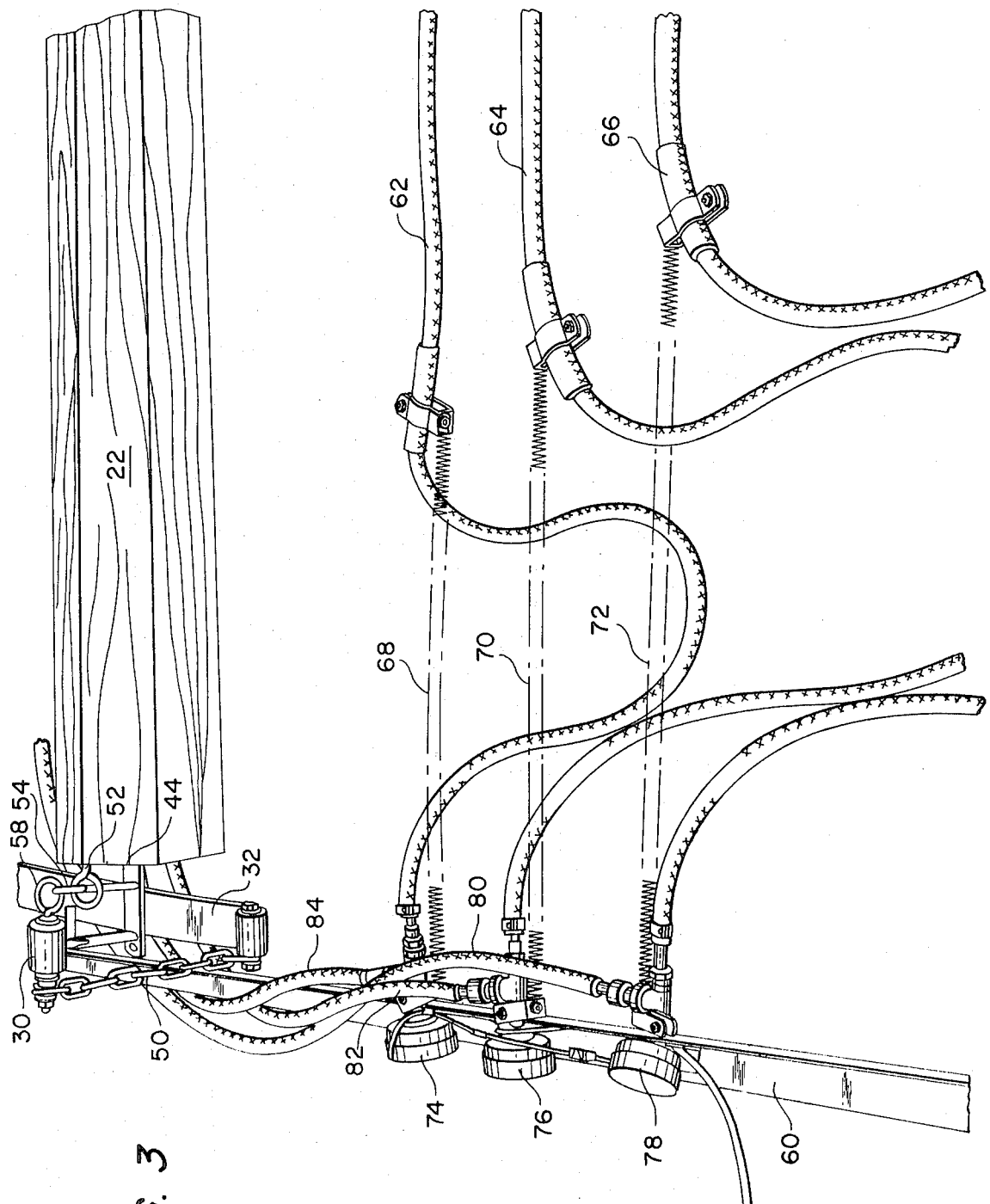
FIG. 3 is an enlarged fragmentary top plan, showing resilient suspensioning of the pneumatic lines parallel to the curb.
Figure 4:
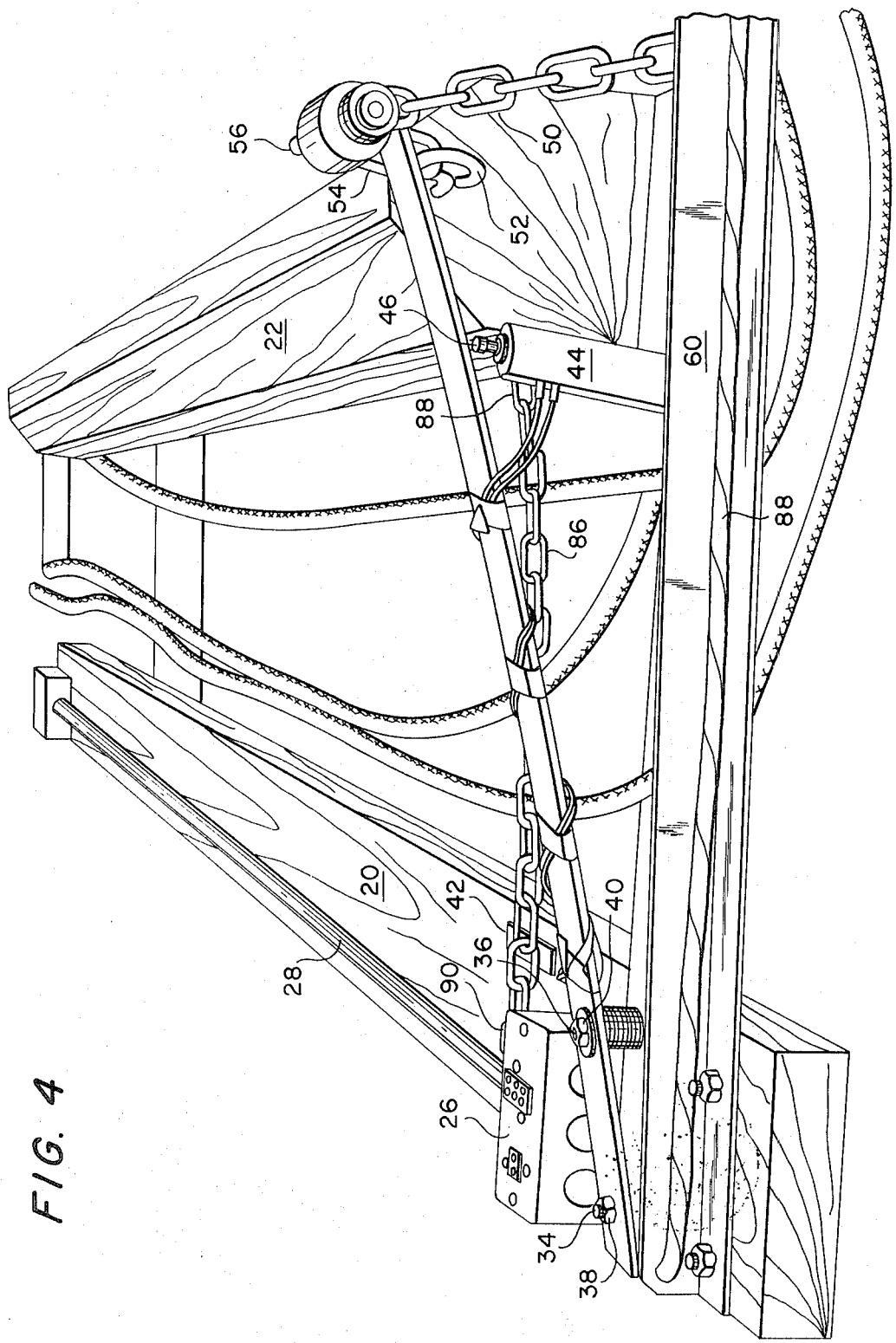
FIG. 4 is an enlarged perspective, showing the vehicle base, transverse beam and the leaf spring suspension of the curb element.

The individual curb-like devices 16 include base element 20 supporting signalling wiring conduit 28, junction box 26 and at each end, as illustrated in FIGS. 2 and 4, a pair of leaf type springs 30, 32 secured at one end to base 20 by means of bolts 36, 34 and corresponding nuts 38 and 40. A plurality of washers 42 may be supported upon bolt 36 between intermediate springs 30 and 32, so as to raise element 30 vertically with respect to the base. The outer or lower end 18 of spring 32 may rest upon the ground. Curb element 22, as illustrated, is suspended by means of eye-bolt 58 secured in the end of spring 30, intervening chain link 54 and eye-bolt 52 mounted in the curb element, such that the curb element is suspended an inch or two above the parking surface. A push-button type switch 46, mounted in bracket 44 and secured to spring 32 by means of stove bolt 48 or the like may be connected to junction box 26 by means of wiring 56, such that depression of the curb and bending of the upper element 30 will depress the push button switch 46 and activate a corresponding scoring and signalling indicator (not illustrated) in the command station.

The pressure sensitive signalling means may include pneumatic lines or alternatively other pressure sensitive means which may be monitored electrically. A pair of transverse beams 60, 60' extend laterally from the base so as to support the suggested pneumatic lines 62, 64, 66, their respective tension spring retainers 68, 70 and 72 and signalling switches 74, 76 and 78.

As illustrated in FIG. 1, the pneumatic lines 62, 64 and 66 are constructed in continuous circuit, such that the air pressure is not bled from the system. Pneumatic junction boxes 24 may include an air breathing device, such that air is admitted or temperature variations cause differences in the size and, thus, volume of lines 62, 64 and 66. The signalling switches are a conventional item and may be manufactured without perforated diaphragms. Thus, the sysforms an air-tight ring of compressed air. The driver trainee may thus park without activating the signals, the curb being turned off. Upon the command, the switches may be energized by means of a microphone or horn signal, scoring the driver at will as his parking is completed. Similarly, the scoring system may be de-energized by microphone or the trainee's activating the auto horn, permitting the driver trainee to leave the parking area without creating additional scoring. Alternatively, of course, the scoring system may be kept "on," so as to score the student's departure from the parking area.

The curb 22 may be constructed of wood, plastic or the like 9 or 10 feet in length. The pneumatic lines may be positioned, respectively in front of a curb at 12 inch, 16 inch, and 20 inch intervals. As will be apparent, the pneumatic lines are of sufficient length to permit longitudinal adjustment of the curb elements 22, 22' with respect to each other so as to simulate a variety of conventional or small car or truck parking situations.

The curb element 22 may also be restrained by vertical chain 50 extending from top spring 30 outer end to the end 18 of the lower spring 32 and by horizontal chain 86 extending from eye-bolt 88 to a corresponding eye-bolt 90 vertically positioned in base element 20. The chain 86 may include a wired portion which abuts contact plate 42 supported upon base 20 so as to close a signalling system, as the curb may be pushed inwardly toward the base element, thus slacking the chain so that it rests upon contact plate 42.

Manifestly, the curb elements may be variously configured and suspended with respect to the base element and the signalling elements may be variously configured or disposed with respect to the elements without departing from the spirit of invention.

I claim:
1. A vehicle parking instruction device comprising:
   A. a base including means extending laterally thereof as a support for a simulated curb;
   B. a simulated curb resiliently suspended apart from said base and above a parking surface;
   C. at least one pressure sensitive element supported upon said parking surface adjacent said curb; and
   D. signal means connected to said pressure sensitive element as an indicator of the student vehicle tire position with respect to said curb.
2. A vehicle parking instruction device of the type used in vehicle parking instruction as in claim 1, including:
   E. scoring means connected to said pressure sensitive element and having a visual readout scoring the student's parked vehicle tire position with respect to said curb.
3. A vehicle parking instruction device of the type used in vehicle parking instruction as in claim 2, wherein said scoring means is keyed to said horizontal restraining chain and plate so as to score and readout lateral inward disposition of said curb.
4. A vehicle parking instruction device comprising:
   A. A base including leaf spring means mounted in said base and extending laterally thereof as a support for a simulated curb;
   B. a simulated curb resiliently suspended apart from said base and above a parking surface;
   C. at least one pressure sensitive element supported upon said parking surface adjacent said curb; and
   D. signal means connected to said pressure sensitive element as an indicator of the student vehicle tire position with respect to said curb.
5. A vehicle parking instruction device of the type used in vehicle parking instruction as in claim 4, including a push button switch interposed between said base and said leaf spring means, as a signal for depression of said curb and leaf spring with respect to said base.
6. A parking instruction device of the type used in vehicle parking instruction as in claim 5, including:
   i. a horizontal restraint resiliently extending from said base to said curb;
   ii. a vertical restraint extending from said curb to said base.
7. A vehicle parking instruction device of the type used in vehicle parking instruction as in claim 6, said pressure sensitive element being pneumatic and in the form of a plurality of lines extended parallely in front of said curb.
8. A vehicle parking instruction device of the type used in vehicle parking instruction as in claim 7, said pneumatic line being configured as a continuous circuit and said signal means being actuable upon command.
9. A vehicle parking instruction device of the type used in vehicle parking instruction as in claim 8, including a pair of base elements and curbs resiliently suspended with respect to said base elements, so as to define a conventional vehicle parking space.
10. A vehicle parking instruction device of the type used in vehicle parking instruction as in claim 9, said base element including a plurality of beams extending laterally thereof as a support for pneumatic switch devices and signalling elements.
11. A vehicle parking instruction device of the type used in vehicle parking instruction as in claim 9, said curb element being configured in approximation of conventional curb width and height.
12. A vehicle parking instruction device of the type used in vehicle parking instruction as in claim 11, said pneumatic elements being resiliently suspended intermediate said beams so as to define signalling areas parallel to said curb elements.
13. A vehicle parking instruction device of the type used in vehicle parking instruction as in claim 6, said horizontal restraint being in the form of a chain with a signal circuit to define deflection of said curb with respect to said parking surface and slacking of said chain to close said signal circuit.
14. A vehicle parking instruction device of the type used in vehicle parking instruction as in claim 13, said horizontal restraining chain including a circuit breaking portion contactable with a corresponding plate upon said base so as to signal slacking of said chain caused by lateral inward disposition of said curb.
15. A vehicle parking instruction device of the type used in vehicle parking instruction as in claim 14, in combination with simulated vehicles positioned at either end of said curb.

* * * * *